(12) United States Patent
Chiang

(10) Patent No.: US 7,475,623 B2
(45) Date of Patent: Jan. 13, 2009

(54) PRESSING STRUCTURE FOR HOLE-PUNCHING UNIT

(76) Inventor: Chou-Chih Chiang, No. 13, 23th Road, Taichung Ind. Park, Taichung (TW)

( * ) Notice: Subject to any disclaimer, the term of this patent is extended or adjusted under 35 U.S.C. 154(b) by 287 days.

(21) Appl. No.: 11/402,932

(22) Filed: Apr. 13, 2006

(65) Prior Publication Data

US 2007/0240552 A1    Oct. 18, 2007

(51) Int. Cl.
- *B26D 5/08* (2006.01)
- *B26D 1/12* (2006.01)
- *B26F 1/14* (2006.01)
- *G06K 1/08* (2006.01)
- *B42C 13/00* (2006.01)
- *B42C 17/00* (2006.01)
- *B42B 5/00* (2006.01)

(52) U.S. Cl. .............. 83/620; 83/669; 83/684; 234/96; 412/11; 412/15; 412/33

(58) Field of Classification Search ........... 83/669, 83/684, 687, 681, 697, 691, 571, 618, 698.91, 83/686, 682, 699.11, 599; 234/96; 412/11, 412/15, 33; 30/358, 361

See application file for complete search history.

(56) References Cited

U.S. PATENT DOCUMENTS

| | | | | |
|---|---|---|---|---|
| 4,987,811 A | * | 1/1991 | Ikarashi et al. ............... 83/372 |
| 5,575,188 A | * | 11/1996 | Hu ............................ 83/167 |
| 6,079,924 A | * | 6/2000 | Chiang ........................ 412/33 |
| 6,598,505 B2 | * | 7/2003 | Henderson et al. ............ 83/13 |
| 2002/0083814 A1 | * | 7/2002 | Whiteman et al. ........ 83/698.91 |
| 2002/0083815 A1 | * | 7/2002 | Whiteman et al. ........ 83/698.91 |
| 2004/0226428 A1 | * | 11/2004 | Whiteman et al. ........ 83/698.91 |
| 2004/0237748 A1 | * | 12/2004 | Potthoff et al. ................ 83/684 |
| 2005/0081694 A1 | * | 4/2005 | Amdahl et al. ................ 83/669 |
| 2006/0249002 A1 | * | 11/2006 | Ho .............................. 83/687 |

* cited by examiner

*Primary Examiner*—Ghassem Alie
*Assistant Examiner*—Bharat C Patel

(57) ABSTRACT

A pressing structure for a hole-punching unit includes an axle, two wrenching pieces, a pole and two pressing pieces, wherein the axle is axially attached to a case of the hole-punching unit, with one end of the axle axially connecting to a control knob, each wrenching piece connecting to the axle near its end, the pressing piece having a spring coil disposed at its middle and pivotally connected to the pole, and the pressing piece having a pair of lapping portions extending from a first side of the spring coil, and a pair of suppressing portions extending from a second side of the spring coil, the lapping portions leaning against an upper edge of the wrenching piece for the control knob to drive the wrenching piece to move synchronously, so as to let the suppressing portions to press the hole-punching assembly and to fasten the hole-punching assembly.

6 Claims, 7 Drawing Sheets

PRESSING STRUCTURE FOR HOLE-PUNCHING UNIT

BACKGROUND OF THE INVENTION

1. Field of the invention

The present invention is related to a pressing structure of a hole-punching unit, and more particularly, to a multi-hole-punching unit for binding books, and still more particularly, to a pressing structure for fastening a hole-punching assembly to facilitate the process of switching and maintaining the hole-punching assembly.

2. Description of the Prior Art

As of now, hole-punching unit is used to punch holes on a stack of papers to bind papers into a book. Due to different binding styles and requirements, a multi-hole-punching unit is provided to punch a plurality of holes on a stack of papers at a time.

Prior art multi-hole-punching unit is operated by driving a plurality of tool holders disposed at the hole-punching assembly to move back and forth to complete the hole-punching operation on a stack of papers. As the sheet number and the weight of papers vary, the thickness of the paper stack will be different, and configurations such as different binding requirements, gap between each hole and number of holes are different as well. In this case, user has to find a hole-punching assembly having suitable tool holders according to sheet number and paper thickness, and also tries to reduce or increase the number of tool holders based on number of holes and their relative positions. Besides, when the hole-punching assembly malfunctions or the tool-holders are worn down so that the hole-punching unit can't carry out its function, it requires some maintenance and fixing works to be done. However, in prior art hole-punching unit, hole-punching assembly is fixed by complicated structure, it is often necessary to use auxiliary tools to remove the hole-punching assembly, thereby causing inconvenience in maintenance operation.

In view of the above-described deficiencies, after years of constant effort in research, the inventor of this invention has consequently developed and proposed a new pressing structure for hole-punching unit disclosed in the present invention.

SUMMARY OF THE INVENTION

It is an object of the present invention to provide a pressing structure of hole-punching unit, wherein the wrenching piece drives the pressing piece to press the hole-punching assembly by its elasticity and to fasten the hole-punching assembly to facilitate the process of switching and maintaining the hole-punching assembly.

The present invention discloses a pressing structure for a hole-punching unit mainly comprising an axle, two wrenching pieces, a pole and two pressing pieces, wherein the axle is axially attached to a case of the hole-punching unit, with one end of the axle axially connecting to a control knob, each wrenching piece connecting to the axle near its end so as to let the control knob to drive each wrenching piece to move synchronously, the wrenching piece having a retaining edge disposed at each side thereof;

the pole being disposed near the hole-punching assembly, the pressing piece being pivotally disposed on the pole, the pressing piece having a spring coil disposed at its middle and pivotally connected to the pole, and the pressing piece having a pair of lapping shafts extending from a first side of the spring coil, and a pair of suppressing shafts extending from a second side of the spring coil, the lapping shaft leaning against an upper edge of the wrenching piece, the suppressing shaft extending towards the hole-punching assembly so as to let the suppressing shaft to press the hole-punching assembly and to fasten said hole-punching assembly.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
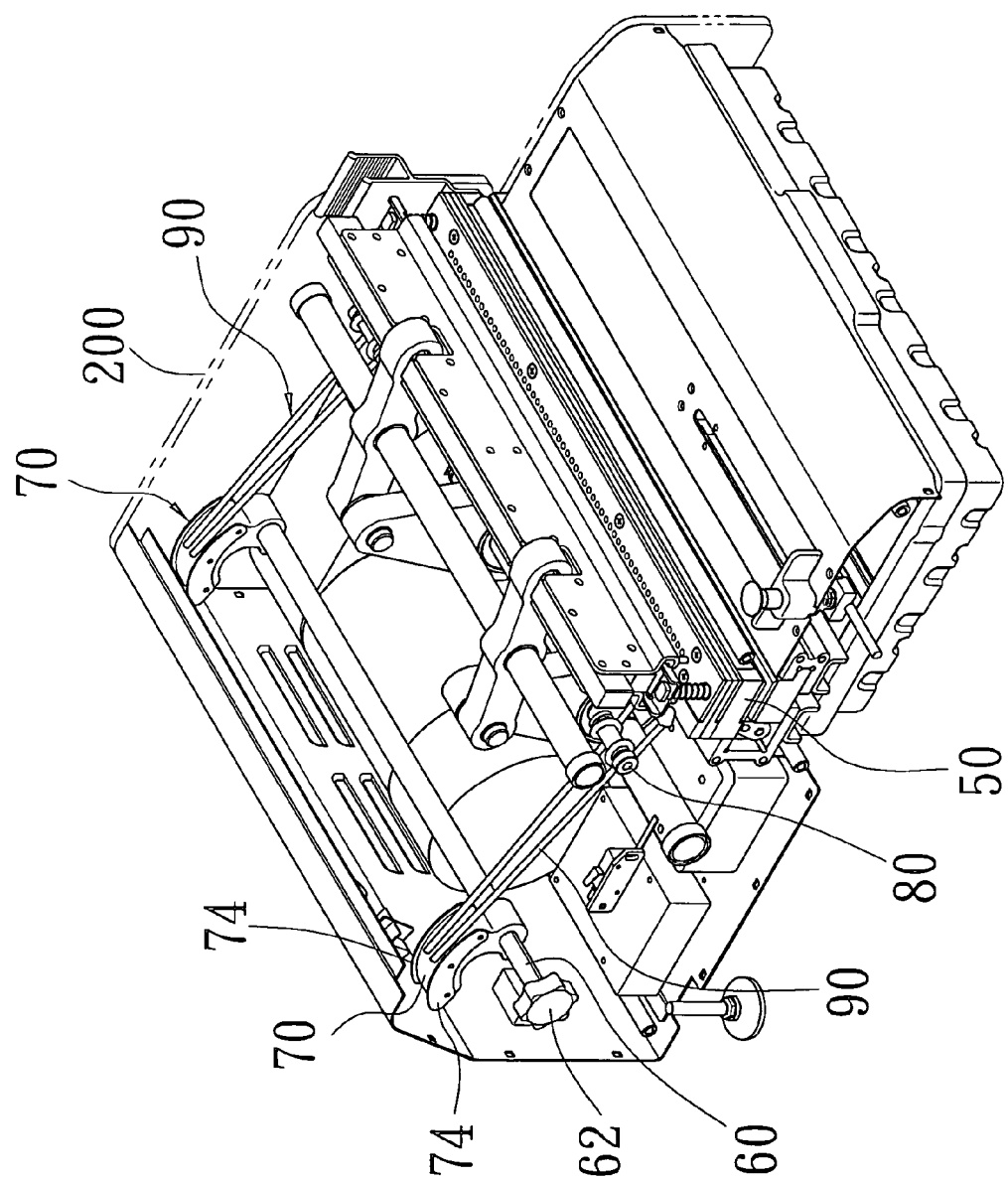
FIG. 1 illustrates a three dimensional view of a first embodiment of the present invention.
Figure 2:
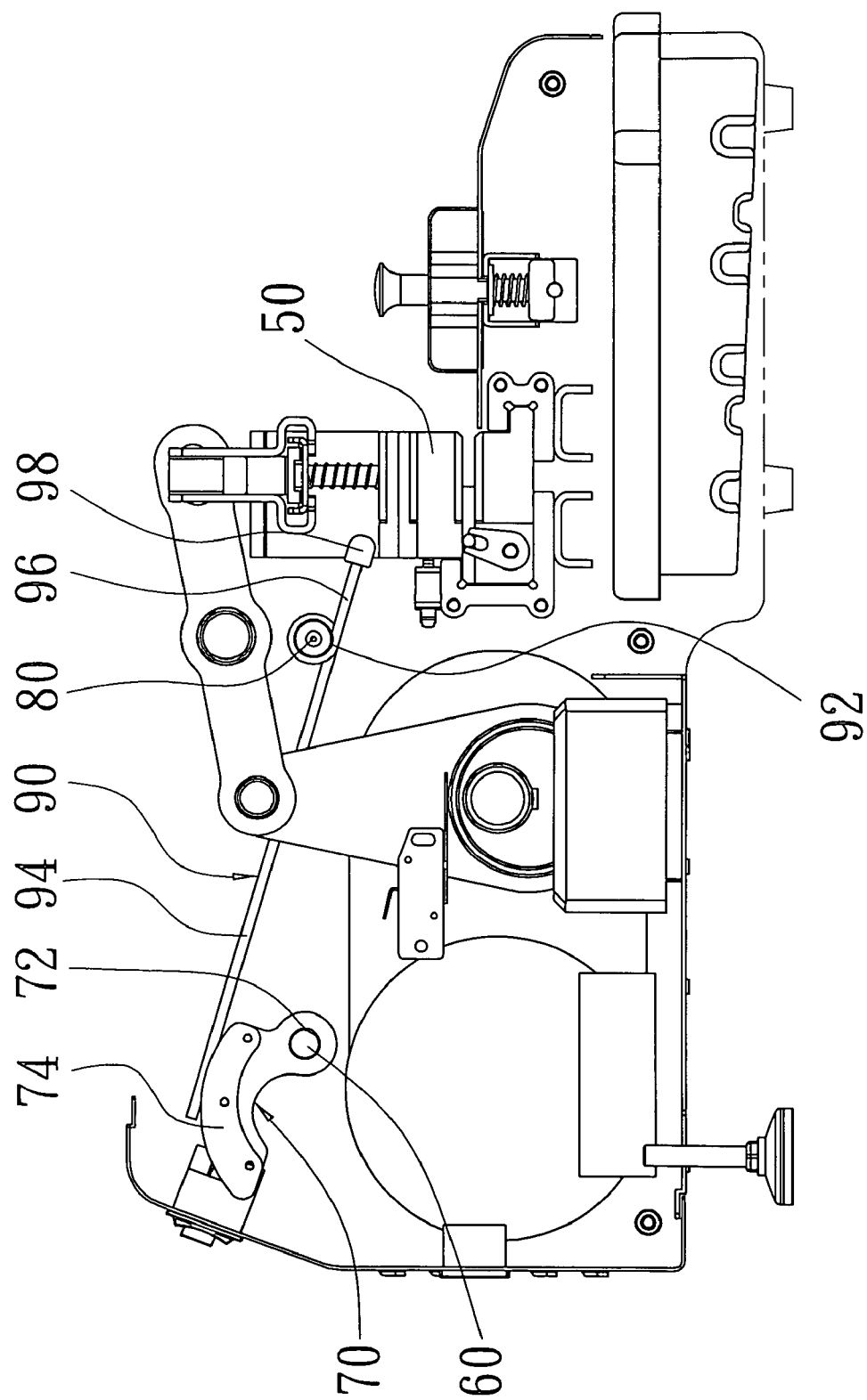
FIG. 2 illustrates a left side view (1) of the first embodiment of the present invention.

Please refer to FIG. 1 and FIG. 2 for a pressing structure of a hole-punching unit in a first embodiment of the present invention, which mainly comprises an axle 60, two wrenching pieces 70, a pole 80 and two pressing pieces 90, wherein each end of the axle 60 is axially connected to a side wall 200 on each side of the case of the hole-punching unit, with one end of the axle 60 protruding through the case to axially connect to a control knob 62, each wrenching piece 70 connecting to the axle 60 near one of its ends, and each wrenching piece 70 having an axle hole 72 disposed thereon for the axle 60 to protrude through the axle hole 72 to connect to the wrenching piece 70, therefore, turning the control knob 62 would let the axle 60 to drive each wrenching piece 70 to turn synchronously, each wrenching piece 70 having a retaining edge 74 disposed at each side of it.

The pole 80 is disposed near a hole-punching assembly 50, with each end of the pole 80 being pivotally connected and fixed to one of the side walls 200, each pressing piece 90 being disposed on the pole 80 and near one side of the pole 80, each pressing piece 90 having a spring coil 92 disposed at its middle and pivotally connected to the pole 80, and the pressing piece 90 having a pair of lapping portions 94 extending from a first side of the spring coil 92, and a pair of suppressing portions 96 extending from a second side of the spring coil 92; the lapping portions 94 leaning against an upper edge of the wrenching piece 70 and using the retaining edge 74 to restrain the suppressing portions 96 so as to keep the lapping portions 94 in contact with the wrenching piece 70 and to prevent the lapping portions 94 from slipping away to further ensure the reliability of the mechanism which the wrenching piece 70 uses to drive the pressing piece 90; the suppressing portions 96 extending towards the hole-punching assembly 50 to let the suppressing portions 96 to press the hole-punching assembly 50 and to fasten the hole-punching assembly 50.

Figure 3:
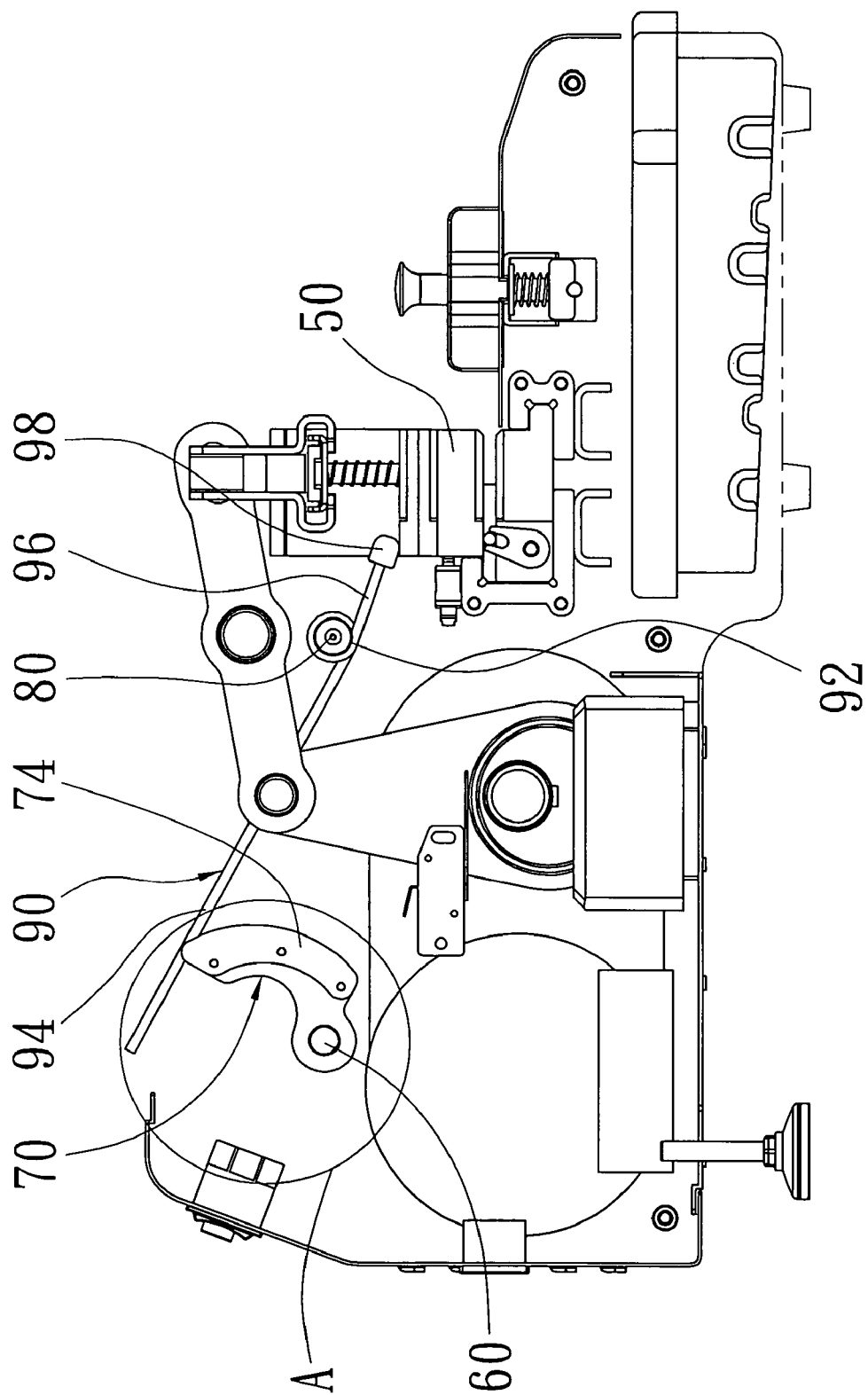
FIG. 3 illustrates a left side view (2) of the first embodiment of the present invention.

Please refer to FIGS. 1~3, when the hole-punching assembly 50 is installed in the hole punching unit, in order to fasten the hole-punching assembly 50 to commence the hole-punching operation, the user can turn the control knob 62, and consequently through the axle 60 to drive each wrenching piece 70 to turn synchronously. When the upper edge of the wrenching piece 70 is pushing against the lapping portions 94 to let the pressing piece 90 to deform elastically, in the meantime, the spring coil 92 would apply the elastic force on the suppressing portions 96 to let the latter to press the hole-punching assembly 50, as shown in FIG. 3. Besides, as the wrenching piece 70 turns to force the lapping portions 94 to make contact with an end of the wrenching piece 70 so that the lapping portion 94 and the wrenching piece 70 lean against with each other.

Figure 3A:
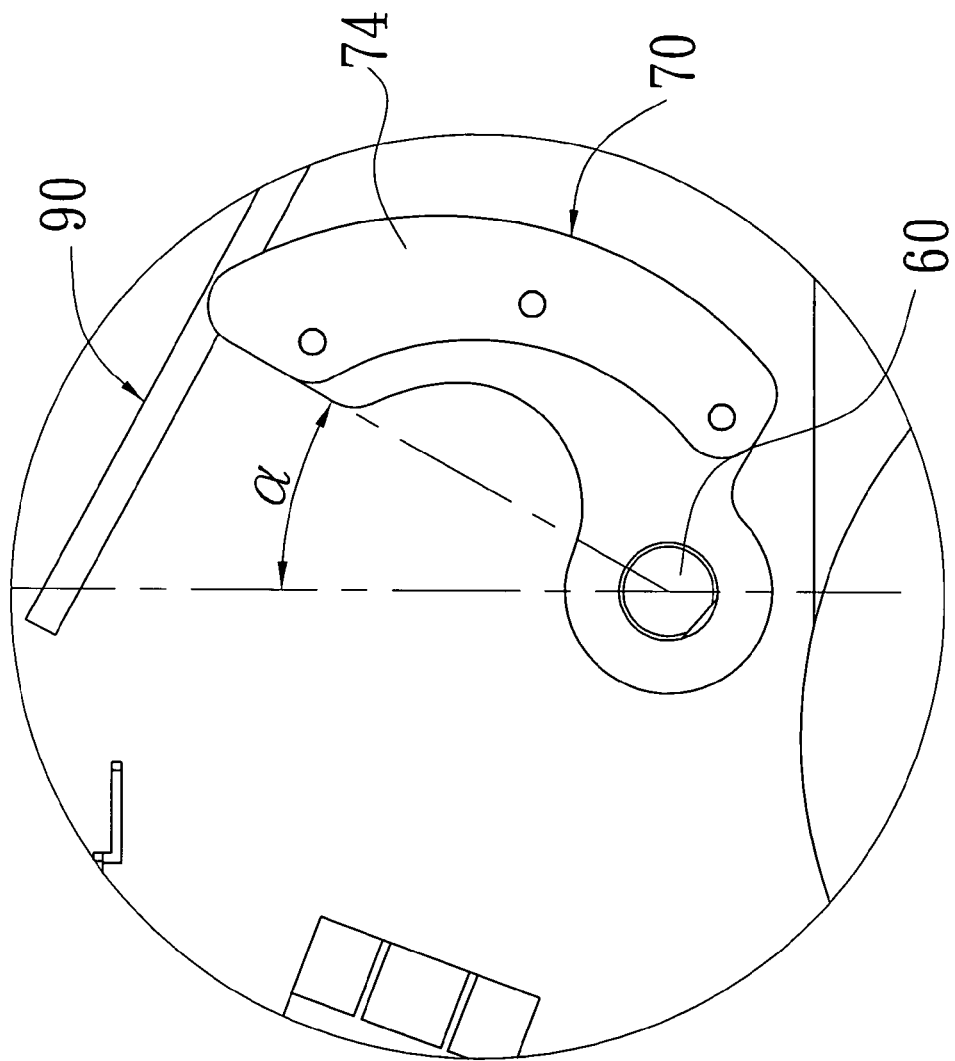
FIG. 3A illustrates a magnifying view of FIG. 3 for the first embodiment of the present invention.

As shown in FIG. 3A, when the control knob 62 turns each wrenching piece 70, an included angle α formed by a vertical line through the center of the axle 60 with an end of the wrenching piece 70 is smaller than 90°. That is, when the user stops turning the control knob 62, the counterforce of the lapping portions 94 is still not capable of driving the wrenching piece 70 to go back to the previous position, then the pressing piece 90 would stay to put and continue to press the hole-punching assembly 50 to ensure the hole-punching assembly 50 to be in the fixed position for certain. Afterwards, when it is necessary to maintain/repair or to switch the hole-punching assembly 50, the user only needs to turn the control knob 62 in the opposite direction to let the axle 60 to drive each wrenching piece 70 to turn synchronously, then the wrenching piece 70 would no longer press against the lapping portions 94 (as shown in FIG. 2), and the pressing piece 90 would return to its initial state by elasticity, thereby releasing the pressing effect of the suppressing portions 96 on the hole-punching assembly 50. Therefore, it is viable to easily and quickly assemble/dismantle the hole-punching assembly 50 without any auxiliary tool and to facilitate the usability and convenience of the hole-punching unit.

Besides, the ends of the suppressing portions 96 have a suppressing part 98 made of elastic material (such as rubber) disposed thereon, using the suppressing part 98 to make contact with the hole-punching assembly 50 and to press it. Through the friction between the suppressing part 98 and the hole-punching assembly 50, it is more reliable for the hole-punching assembly 50 to be fastened to the fixed position.

The second embodiment is derived from the first embodiment mentioned above, please refer to FIGS. 4~5. In the second embodiment, the pressing structure further comprises a tact switch 100', a wrenching piece 70' having a protruding part 76' disposed at its outer edge, the tact switch 100' comprising an elastic plate 102' for controlling an ON/OFF state of the tact switch 100', while the protruding part 76' extending to couple with the elastic plate 102'.

Figure 4:
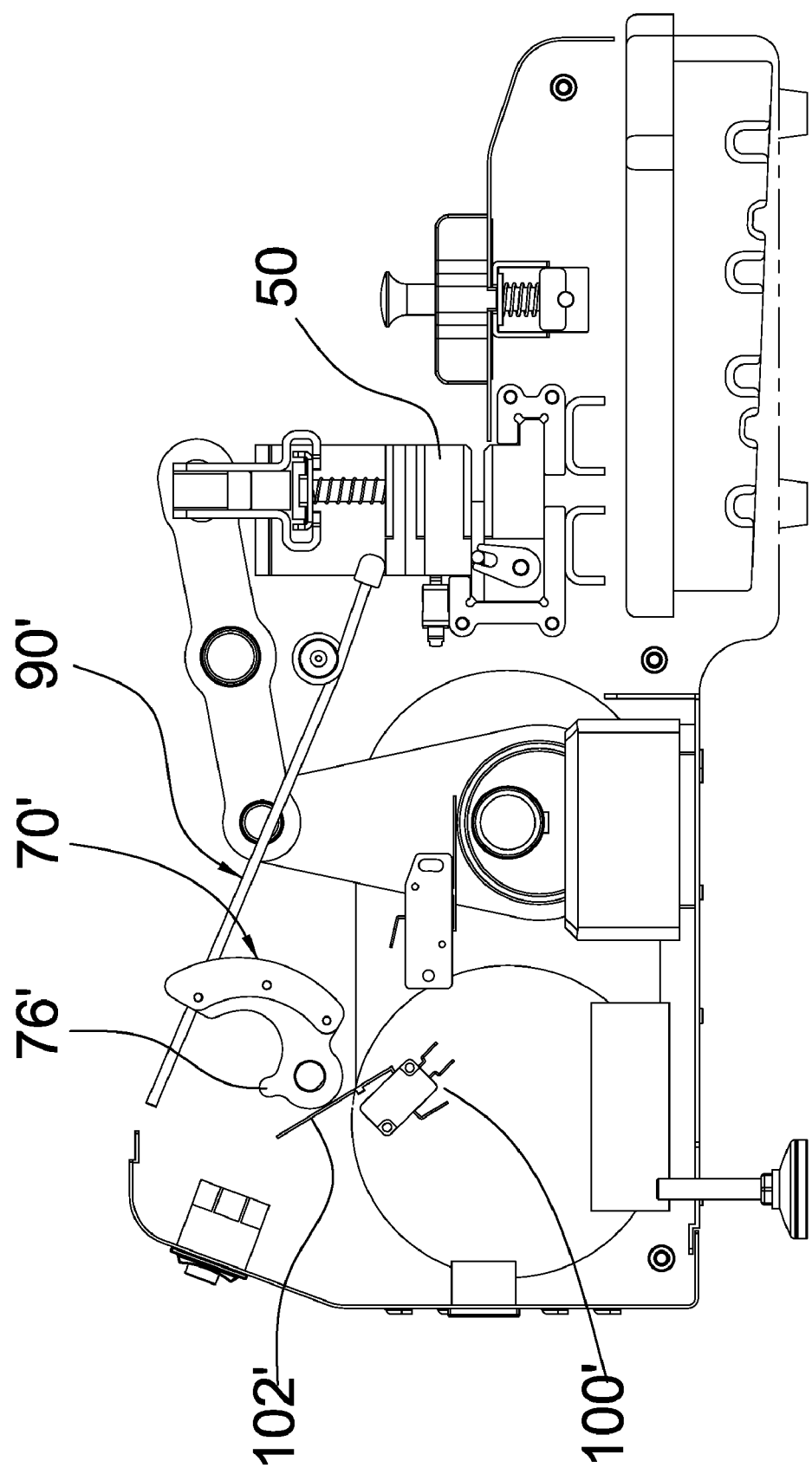
FIG. 4 illustrates a left side view (1) of a second embodiment of the present invention.
Figure 5:
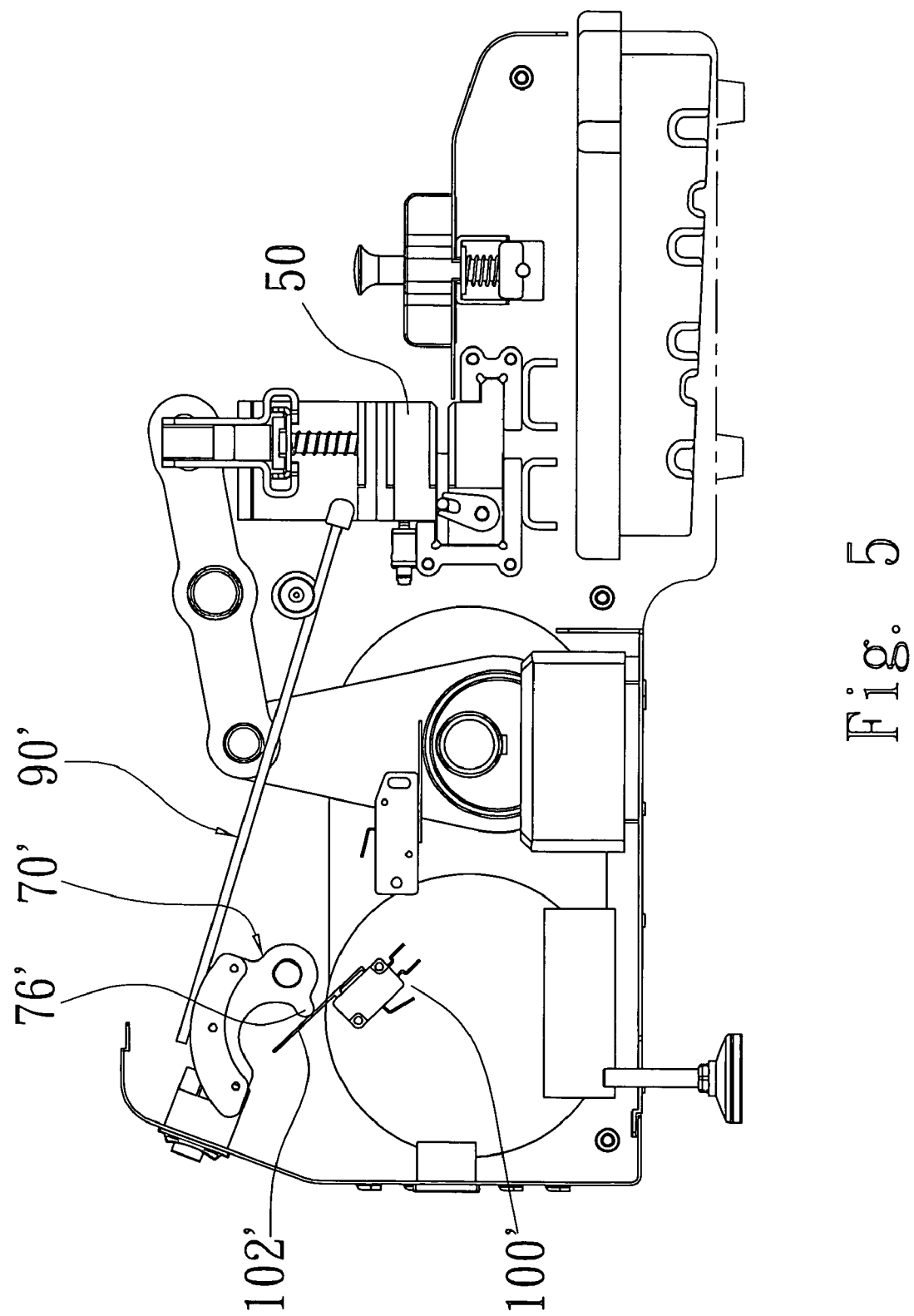
FIG. 5 illustrates a left side view (2) of the second embodiment of the present invention.

When the wrenching piece 70' turns to drive the pressing piece 90' to let the pressing piece 90' to press the hole-punching assembly 50, the protruding part 76' would not make contact with the elastic plate 102' (as shown in FIG. 4) so as to let the hole punching unit to be in the ON state. Consequently, when the wrenching piece 70' turns in the opposite direction to the pressing effect of the pressing piece 90' on the hole-punching assembly 50, the protruding part 76' would make contact with the elastic plate 102' (as shown in FIG. 5) to let the hole-punching unit to be in the OFF state. Then it is viable to switch/maintain the hole-punching assembly 50 and to provide safety when in use.

Figure 6:
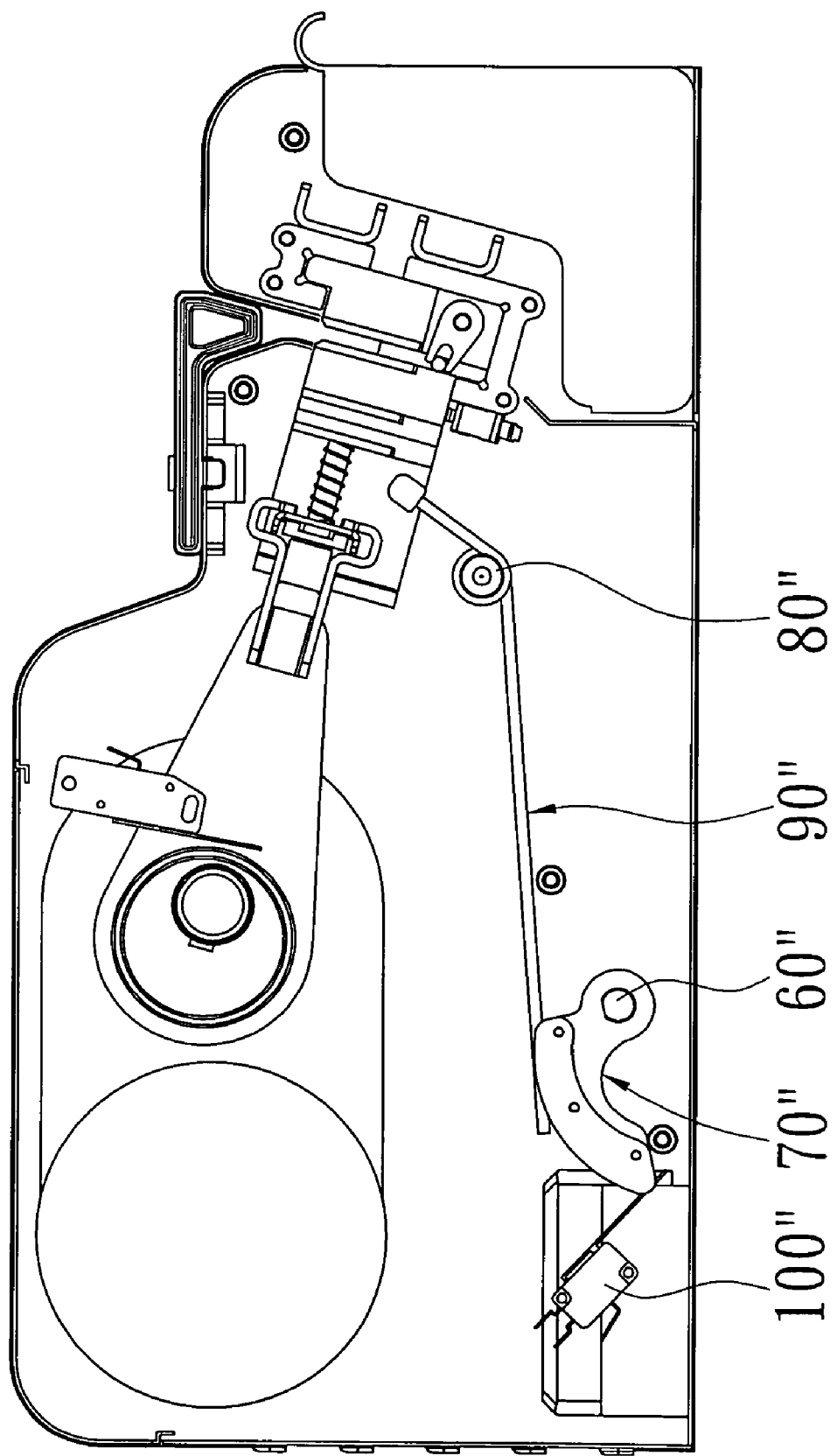
FIG. 6 illustrates a left side view of a third embodiment of the present invention.

The third embodiment of the present invention is a variation of the first embodiment mentioned above. Please refer to FIG. 6, in the third embodiment, the pressing structure comprising an axle 60", two wrenching pieces 70", a pole 80", two pressing pieces 90" and a tact switch 100", wherein the wrenching piece 70" is disposed inside the case of the hole-punching unit and near the lower end of the hole-punching unit.

As described above, the present invention provides a new pressing structure for fastening a hole-punching assembly to facilitate the process of switching and maintaining the hole-punching assembly. Therefore, this application is not only novel and but also applicable in the industry.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A pressing structure for a hole-punching unit mainly comprising an axle, two wrenching pieces, a pole and two pressing pieces, wherein said axle is axially attached to a case of said hole-punching unit, with one end of said axle axially connecting to a control knob, each wrenching piece connecting to said axle near an end thereof so as to let said control knob to drive each wrenching piece to move synchronously, said wrenching piece having a retaining edge disposed at each side thereof;

said pole being disposed near said hole-punching assembly, said pressing piece being pivotally disposed on said pole, said pressing piece having a spring coil disposed at a middle thereof and pivotally connected to said pole, and said pressing piece having a pair of lapping portions extending from a first side of said spring coil, and a pair of suppressing portions extending from a second side of said spring coil, said lapping portions leaning against an upper edge of said wrenching piece, said suppressing portions extending towards said hole-punching assembly so as to let said suppressing portions to press said hole-punching assembly and to fasten said hole-punching assembly.

2. The pressing structure of claim 1, wherein a retaining edge is disposed at each side of said wrenching piece for said retaining edge to restrain said lapping portions and to keep said lapping portions in contact with said wrenching piece.

3. The pressing structure of claim 1, wherein said suppressing portions having a suppressing part disposed at ends thereof.

4. The pressing structure of claim 1, wherein said suppressing part is made of elastic material.

5. The pressing structure of claim 1, wherein said control knob drives each wrenching piece to move synchronously, so that when said suppressing portions of said pressing piece are pressing said hole-punching assembly, an included angle α is less than 90°.

6. The pressing structure of claim 1 further comprising a tact switch, wherein said wrenching piece having a protruding part disposed at an outer edge thereof, said tact switch comprising an elastic plate for controlling an ON/OFF state of said tact switch, said protruding part extending to couple with said elastic plate for said protruding part to drive said elastic plate to switch on/off said hole-punching unit to provide safety when in use.

* * * * *